BALE THROWER

Original Filed Sept. 3, 1968 2 Sheets-Sheet 1

INVENTORS
G. SOTEROPULOS &
T.M. BARNES

BALE THROWER

Original Filed Sept. 3, 1968 2 Sheets-Sheet 2

INVENTORS
G. SOTEROPULOS &
T.M. BARNES

United States Patent Office

Re. 27,657
Reissued June 5, 1973

27,657
BALE THROWER

Gust Soteropulos and Theodore Marion Barnes, by Deere and Co., Moline, Ill., assignee Original No. 3,521,766, dated July 28, 1970, Ser. No. 756,886, Sept. 3, 1968. Application for reissue May 28, 1971, Ser. No. 148,247
Int. Cl. B65g *31/00, 67/22*
U.S. Cl. 214—42 R 5 Claims

Matter enclosed in heavy brackets [ ] appears in the original patent but forms no part of this reissue specification; matter printed in italics indicates the additions made by reissue.

ABSTRACT OF THE DISCLOSURE

A pull-type pickup baler has a fore-and-aft bale case with a rearward discharge opening. A bale thrower is mounted on the baler and includes a horizontal pan which receives successives bales discharged from the bale case. The pan is mounted on a pair of swingable arms, which are actuated by a hydraulic cylinder and swing the pan upwardly and rearwardly when the bale moves onto the pan, to accelerate the bale so that its momentum carries it into a trailing bale-receiving vehicle.

BACKGROUND OF THE INVENTION

This invention relates to a bale-handling apparatus for receiving baled crop material discharged from an agricultural baler and throwing it through the air to a trailing vehicle which receives and temporarily stores the collected bales.

To reduce the manpower needs in baling agricultural forage crops, various types of bale-throwing apparatus have been widely used to automatically load the bales discharged from the baler into a trailing bale-collecting vehicle, thereby eliminating the manual labor previously involved in moving the bales from the baler discharge outlet to the trailing wagon or the like or the separate harvesting operation of later picking up the bales from the ground after discharge from the baler.

Heretofore, the bale-throwing mechanisms have generally been driven by a mechanical drive train, although it has been known to utilize a master-slave hydraulic cylinder arrangement wherein the master cylinder is actuated by the baler plunger. However, the prior throwing mechanisms have been difficult to adjust to accommodate different crops, bale densities, and sizes, and further have been difficult to adjust to vary the bale trajectory and thereby accommodate changes in the terrain and permit more uniform loading of the trailing vehicle.

SUMMARY OF THE INVENTION

According to the present invention, improved hydraulic means are utilized to actuate the bale thrower, thereby eliminating many of the problems associated with mechanical drive trains and prior hydraulic drives.

More specifically, a hydraulically actuated throwing mechanism is provided with means for varying the trajectory of the bale, permitting the bale to be thrown relatively near the desired spot in the trailing vehicle, regardless of the angle of inclination at which the baler is operating, the weight or size of the bale, or the distance between the baler and the trailing vehicle.

DESCRIPTION OF THE PREFERRED EMBODIMENTS

Figure 1:
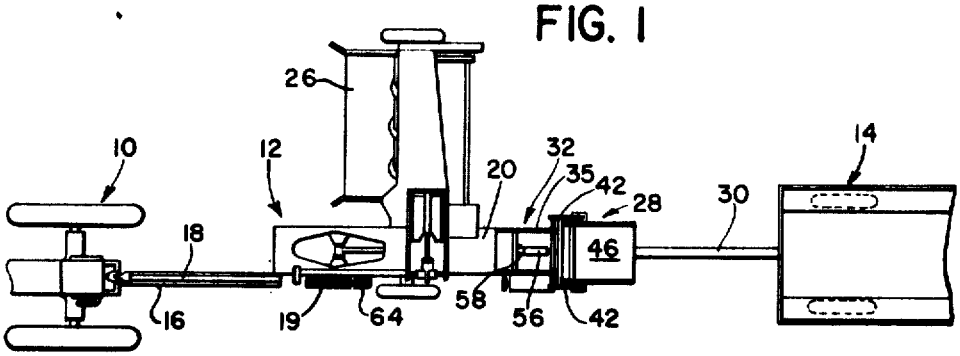
FIG. 1 is a fragmentary plan view of a typical harvesting train used in baling with a bale thrower mounted on the baler, the machines all being drawn to a reduced scale.

In the train of machines shown in FIG. 1, which is typically used to bale hay, a tractor is designated generally by the numeral 10, a baler is designated by the numeral 12, and a trailing wagon is designated by the numeral 14. The tractor is of conventional construction and tows the baler through a fore-and-aft draft member 16, above which is a fore-and-aft drive shaft 18 connected to the tractor power take-off. Some balers are equipped with a separate engine for driving the baler components, although whether the baler has its own power source or utilizes the tractor as a power source is immaterial for the present invention. Conventionally, the power input to the baler drives a flywheel 19, which, in the present case, is mounted on the side of the baler and is connected to and driven by the drive shaft 18. The baler 12 includes a fore-and-aft bale case 20 having a rearward discharge opening or outlet 22 from which the bales emerge after formation in the bale case 20. The bale case has a generally horizontal floor 24 which projects a short distance beyond the bale outlet 22.

As the machines advance, the crop is removed from the field by a pickup mechanism 26, which is conventionally laterally offset from the tractor and the trailing vehicle, and after removal from the field, the crop is delivered transversely into the bale case, wherein it is compacted into bales. As the bales emerge from the outlet 22, they are received by a bale-throwing mechanism, indicated generally by the numeral 28, the bale-throwing mechanism throwing the bales through the air to the trailing wagon 14, which is connected to the rear end of the baler 12 by a fore-and-aft draft member 30 and is spaced remotely from the rear end of the bale case in general fore-and-aft alignment therewith.

The bale-throwing mechanism 28 includes a supporting structure 32, mounted on top of the bale case 20 and formed by a pair of upright fore-and-aft extending side plates 34 connected by a hollow transversely extending member 35, the member 35 and the side plates 34 forming an enclosed container 36, which functions as a hydraulic reservoir. The supporting structure also includes a pair of arms 37 depending from the bottom of the container 36 and respectively mounted on a pair of fore-and-aft aligned pivots 38 carried by a pair of brackets 40 mounted on the top of the bale case 20. The mounting of the supporting structure on the fore-and-aft pivots 38 permits angular adjustment of the throwing mechanism, as is known in the art, and adjusting mechanism (not shown) conventionally being provided to establish the angular position of the supporting structure.

Figure 2:
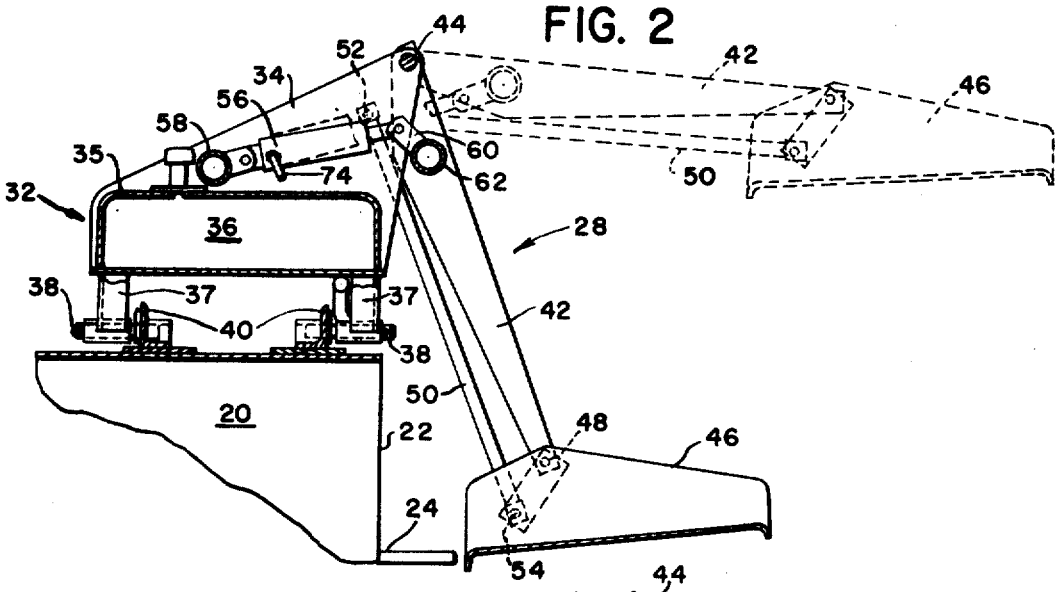
FIG. 2 is a side elevation view, partly in section, showing a bale thrower mounted on the rear end of the baler, the release position of the throwing mechanism being shown in dotted lines.

A pair of transversely spaced, elongated throwing arms 42 have their upper ends swingably mounted on a transverse pivot 44 [etxending] *extending* between the side plates 34. A generally U-shaped horizontal pan or bale-engaging element 46 is swingably mounted on the lower ends of the arms 42 on a transverse pivot 48, the pan being maintained in a generally horizontal position by a pair of links 50 parallel and adjacent to the throwing arms 42, the upper ends of the links 50 being swingable on a transverse pivot 52 rearwardly of the pivot 44 and the lower ends of the links 50 being connected to the pan via a pivot 54 rearwardly of and below the pivot 48. The throwing arms 42, the links 50, the supporting structure 32 and the pan 46 form a parallelogram-type linkage, which maintains the pan in a horizontal condition during the throwing cycle of the mechanism. In the normal or starting position of the pan, shown in full lines in FIG. 2, the pan is immediately to the rear of and at substantially the same level as the rearward end of the floor 24, the pan being slightly wider than a conventional bale and supporting successive bales as they emerge from the bale case outlet 22 after they leave the bale case floor 24. During the bale-accelerating or throwing portion of the cycle, the throwing arms 42 and links 50 swing rearwardly and upwardly about their pivots on the supporting structure and swing the pan or bale-engaging element 46 rearwardly and upwardly to its discharge position, which is shown in dotted lines in FIG. 2, thereby imparting a momentum to the bale carried by the pan. When the discharge or release position is attained, the throwing mechanism stops its upward and rearward movement, while the bale's momentum carries it through the air into the wagon 14. After the throwing mechanism reaches its release position, it begins the return portion of its cycle wherein the pan returns to its starting position adjacent to the bale case outlet.

The throwing arms 42 and the pan 46 mounted thereon, are actuated in their throwing cycle by a single one-way hydraulic cylinder 56, having one end pivotally connected to a transverse member 58 rigidly connected to and extending between the side plates 34, and its other end pivotally connected to a relatively short arm 60 rigidly connected to a transverse tubular member 62 rigidly connected to and extending between the throwing arms 42. The tubular member 62 is spaced below the pivot 44, so that extension of the cylinder 56 swings the arms 42 rearwardly and upwardly to shift the throwing mechanism from its starting to its release position.

Figure 3:
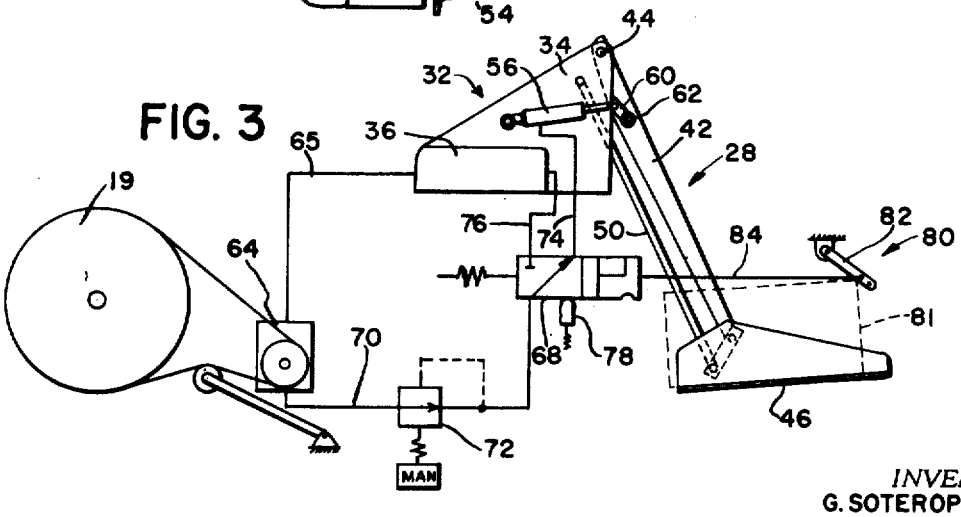
FIG. 3 is a schematic illustration of a bale thrower and its associated hydraulic system.

The hydraulic cylinder is actuated by a hydraulic system, which is schematically shown in FIG. 3. In the illustrated embodiment, the hydraulic system utilizes a constant delivery hydraulic pump 64 having an inlet line 65 connecting the pump to the reservoir formed by the container 46. The pump is mounted on the baler adjacent the flywheel 19 and driven thereby. The tractor hydraulic pump can also be used as a fluid pressure source and connected with the bale-throwing mechanism through suitable hydraulic hoses. However, if the tractor has a closed center hydraulic system with a variable delivery pump, it would probably be necessary to provide an accumulator in the hydraulic system since the flow rate and rate of response in such a system would ordinarily not be sufficient to provide the necessary rapid extension of the cylinder 56. However, it is contemplated that a tractor having a high capacity constant delivery pump in an open center hydraulic system could be used as the bale thrower fluid pressure source.

Figure 4:
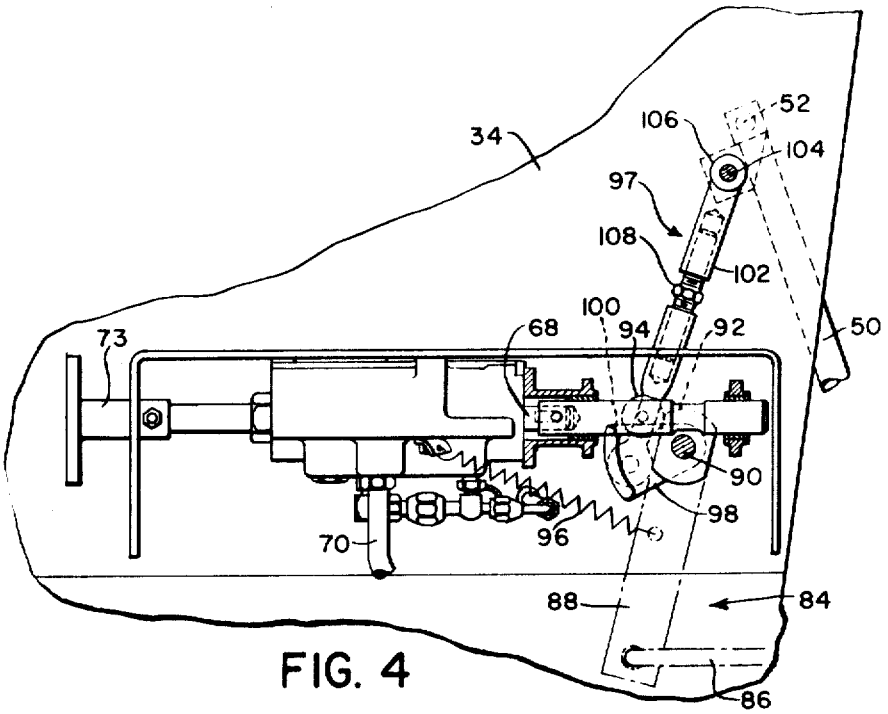
FIG. 4 is an enlarged fragmentary side elevation view of the controls of the bale-throwing mechanism, showing the controls in a neutral condition wherein the bale-throwing mechanism is unactuated.
Figure 5:
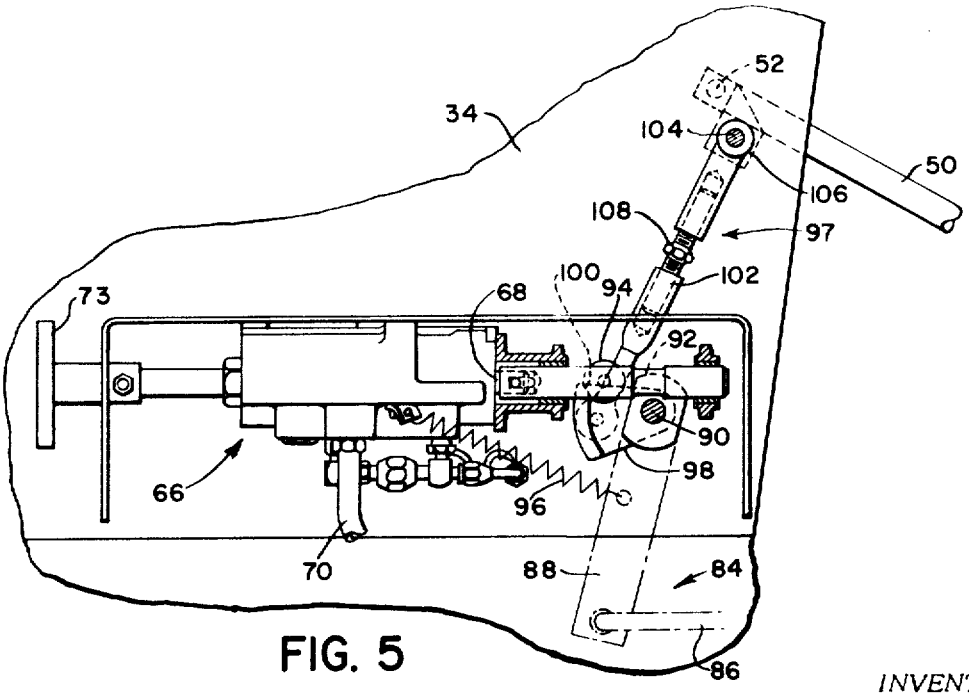
FIG. 5 is a view similar to FIG. 4 but showing the controls during the throwing stroke of the mechanism, just prior to the release of the bale.

The hydraulic system includes a control valve package 66 mounted on the side of the supporting structure 32, only the exterior of the control valve package being shown in FIGS. 4 and 5. As shown in FIG. 3, the control valve package includes a two-position control valve 68 connected to the pump 64 by a pressure inlet conduit 70 in which an adjustable pressure-regulating valve 72 is disposed to selectively vary the pressure supplied to the control valve 68 and consequently the pressure supplied to the cylinder 56. In the illustrated embodiment, the pressure-regulating valve is manually adjusted by a control knob 73 extending forwardly from the valve package 66. It is contemplated that the pressure-regulating valve be adjustable by the operator from the operator's station on the tractor, and it is apparent that a suitable linkage could be provided to permit remote adjustment of the regulating valve. Of course, other means such as a small electric motor controlled by the operator from the operator's station, could be provided to adjust the pressure supply to the control valve.

The hydraulic system is an open center system, and in one position the control valve 68 ports pressurized fluid to the cylinder 66 through an outlet line 74, and in the other position the pressurized fluid and the drainage fluid from the cylinder 56 are connected directly to the reservoir 36 by a sump line 76.

The valve 68 is spring loaded toward the position shown in FIG. 3, wherein it directs fluid pressure to the cylinder. However, the spring load alone is not sufficient to overcome a detent mechanism 78, which normally holds the valve in its closed condition, wherein it connects the cylinder and the pump to the reservoir. However, a trip mechanism 80 is connected to the valve 68 and, when actuated, provides sufficient force to shift the valve out of its detented position, and, once the valve is freed from its detent position, the valve spring holds it in its open condition wherein it supplies fluid pressure to the cylinder. The trip mechanism 80 acts to shift the valve to its open condition in response to a bale of hay, indicated by the dotted line outline 81 in FIG. 3, reaching a predetermined position on the pan 46, and includes a bale-sensing element or lever 82 shiftable in response to movement of the bale 81 completely onto the pan and a suitable linkage 84, which transmits the movement of the element 82 to the valve 68.

The linkage 84 includes a fore-and-aft rod 86, which moves rearwardly when a bale is fully positioned on the pan 46, and a lever 88 having it lower end connected to the rod 86 and its upper end swingable on a transverse pivot 90 mounted on the supporting structure. The lever 88 carries a cam 92 enagageable with a roller 94 on the spool of the control valve 68. The lever 88 is biased forwardly by a spring 96, but when the bale-sensing lever 82 is acted on by the bale, the rod 86 swings the lever 88 rearwardly, in a counterclockwise direction in FIGS. 4 and 5. The rotation of the lever rotates the cam 92, which is in engagement with the roller 94 on the valve spool shifting the valve spool forwardly (to the left in FIG. 4) and thereby moving the valve spool out of its detented position. As previously described, the valve spring immediately moves the valve 68 into its fully opened position and pressurized fluid is immediately ported to the hydraulic cylinder 56 to swing the arms 42 and the pan 46 carried thereby upwardly and rearwardly.

Pressurized fluid is ported to the cylinder 56 until the valve 68 is again shifted to its closed position, and this is accomplished by an adjustable shut-off mechanism, indicated generally by the numeral 97. The shut-off mechanism includes a cam member 98 mounted for swinging movement on the pivot 90 and having a cam surface 100 engageable with the forward side of the roller 94. The cam 98 is rocked in response to movement of the throwing mechanism, since it is connected to the parallel links 50 by an adjustable link 102, having its lower end pivotally connected to the cam 98 and its upper end connected to a transverse pivot 104 rigidly supported by a pair of arms 106 attached to and swingable with the parallel links 50. As can best be appreciated by comparing FIGS. 4 and 5, as the links 50 swing rearwardly and upwardly, the pivot 104, which is spaced from the pivot 52, swings rearwardly and upwardly, thereby swinging the cam 98 upwardly about the pivot 90 until the cam surface 100 engages the forward side of the roller 94, as shown in FIG. 5. Once the cam surface 100 engages the roller 94, additional swinging of the arm 50 and consequently swinging of the cam 98, forces the roller 94 and the valve spool on which it is mounted rearwardly, returning the valve to its detented position wherein it shuts off the fluid pressure supply to the cylinder 56.

The adjustable link 102 is provided with a turnbuckle type of mechanism 108 so that its length may be adjusted. As is apparent from FIGS. 4 and 5, lengthening of the link 102 permits movement of the throwing arms to a higher position before the control valve interrupts the fluid pressure supply to the cylinder, while, conversely, shortening the link 102 shortens the throwing stroke of the throwing mechanism.

In operation, the baler 12 removes the crop from the field and forms successive bales, which emerge from the outlet opening 22 and move on to the pan or bale-engaging element 46 of the bale-throwing mechanism 28. After the bale attains a predetermined position on the pan 46, it actuates a trip mechanism 80 which shifts the control valve 68 out of its detent position to the open condition shown in FIG. 3, wherein it immediately ports pressurized fluid to the cylinder 56. The resulting extension of the cylinder 56 swings the arms 42, and consequently the pan and the bale carried thereon, upwardly and rearwardly until the shut-off mechanism 97 returns the control valve 68 to its closed condition, wherein it interrupts the supply of fluid pressure to the cylinder.

The pressure supply to the cylinder is relatively high, so that the cylinder exerts sufficient force to rapidly accelerate the pan 46. The resulting velocity provides the bale with sufficient momentum to carry it through the air to the wagon 14. Of course, the higher the velocity of the bale at the cut-off or release point, the greater its momentum, and consequently the greater the distance it will fly through the air. Since the acceleration of the bale depends on the force exerted by the hydraulic cylinder 56, which, in turn, depends on the pressure supplied to the cylinder, the distance the bale is thrown can be varied by varying the pressure supplied to the cylinder. As previously described, the pressure is variable by adjustment of the pressure-regulating valve 72, so that the operator can select the distance to which the bale is to be thrown by merely adjusting the valve. Preferably, the pressure-regulating valve 72 is adjustable by the operator from his station on the tractor, permitting the operator to remotely adjust the throwing mechanism to compensate for differences in the weight and size of the bales or the angle of inclination at which the machines are operating or to vary the distance the bales are thrown. For example, if the machines are operating up a relatively steep incline, the pressure supplied to the cylinder is reduced since the mechanism will be throwing the bales downhill, and, if normal pressure were supplied, the mechanism might overthrow the wagon. The one-the-go adjustment of the throwing distance also permits the operator to first throw the bales into the back of the wagon, and thereafter reduce the system pressure so that the bales will be thrown into the front of the wagon.

As also previously described, the length of the throwing stroke is also variable by adjustment of the link 102 to vary the release or cutoff point. As is apparent, the later the release point, the greater is the vertical component of the bale's momentum, so that a bale will have a higher trajectory when the release point is adjusted upwardly. Conversely, a relatively low release point, with a relatively short throwing stroke, will [produec] *produce* a flatter trajectory. Thus, the operator can select a trajectory which best suits his equipment and the terrain on which he is operating. Since both the bale trajectory and initial velocity can be varied, the hydraulically actuated bale throwing mechanism provides a large degree of flexibility and should result in fewer bales missing the wagon.

What is claimed is:

1. In an agricultural machine having a bale discharge area from which successive bales of harvested crop materila move during operation of the machine and having an associated power source and a trailing remotely-spaced vehicle with a receptacle adapted to receive said bales, the combination therewith of a bale-throwing apparatus for delivering successive bales from the bale discharge area to the receptacle on the trailing vehicle and comprising: a bale-throwing mechanism mounted on the machine and including a bale-engaging element moveable in a cycle including a bale-throwing cycle portion and a return cycle portion and adapted to successively engage bales emerging from the discharge area and accelerate the bales during the bale-throwing portion of the cycle to a discharge speed wherein the momentum of the bale carries it through the air to the bale receptacle; a hydraulic pump connected to and constantly driven by the power source; hydraulic motor means operatively associated with the bale-engaging element and actuatable in response to fluid pressure from the hydraulic pump to move the bale-engaging element through its bale-throwing cycle portion; a control valve means shiftable between first and second positions wherein it respectively connects and disconnects the hydraulic pump to and from the hydraulic motor means; *an adjustable pressure regulating valve operatively connected to the hydraulic pump for selectively varying the pressure of the fluid supplied to the hydraulic motor means and thereby varying the force exerted by the hydraulic motor means on the bale-engaging element;* and means responsive to movement of a bale from the bale discharge area to a predetermined position wherein it is engaged by the bale-engaging element to shift the control valve means to its first position to actuate the hydraulic motor means.

[2. The invention defined in claim 1 and including an adjustable pressure regulating valve operatively connected to the hydraulic pump for selectively varying the pressure of the fluid supplied to the hydraulic motor means.]

3. The invention defined in claim 1 and including means operatively connecting the control valve means and the bale-throwing mechanism for shifting the control valve means to its second position when the bale-throwing element reaches a predetermined position in its bale-throwing cycle.

4. In an agricultural machine having a bale discharge area from which successive bales of harvested crop move during operation of the machine and having an associated power source and a trailing remotely-spaced vehicle with a receptacle adapted to receive said bales, the combination therewith of a bale-throwing apparatus for delivering the successive bales from the bale discharge area to the bale receptacle and comprising: a supporting structure connected to the machine adjacent to the bale discharge area; a bale-engaging element; arm means having one end swingably connected to the [suppotring] *supporting* structure and the other end connected to the bale-engaging element for swing movement of the element between a starting position adjacent to and in a bale-receiving relationship with the bale discharge area and a bale release position upwardly and away from the starting position toward the trailing vehicle receptacle; a source of fluid pressure; hydraulic motor means operative between the supporting structure and the arm means and actuatable to swing the bale-engaging element from its starting position to its bale release position; [and control means for supplying fluid pressure from the fluid pressure source to the hydraulic motor means to actuate the motor means when a bale reaches a predetermined position of engagement by the bale-engaging element, whereby the bale is accelerated by the bale-engaging element as it moves from its starting position and released when the element reaches its release position, the bale momentum carrying the bale through the air to the trailing vehicle receptacle] *a control valve means shiftable between a first condition wherein it supplies pressurized fluid from the fluid pressure source to the motor means and a second condition wherein it interrupts the supply of pressurized fluid to the motor means; a bale-sensing element shiftable between a normal position and a deflected position in response to movement of a bale to said predetermined position of engagement by the bale-engaging element; means connecting the sensing element to the control valve means to shift the control valve means to its first condition when the sensing element moves to its deflected position; shut-off means operatively connected to the control valve*

*means and the engaging element for shifting the control valve means to its second condition when the engaging element reaches a predetermined position to thereby establish the release position of the engaging element; and adjusting means operatively associated with said shut-off means to selectively vary the predetermined position at which the control valve means is shifted to its second position and thereby vary the trajectory of the bale.*

[5. The invention defined in claim 4 wherein the control means includes a control valve means shiftable between a first condition wherein it supplies pressurized fluid from the fluid pressure source to the motor means and a second condition wherein it interrupts the supply of pressurized fluid to the motor means, a bale-sensing element shiftable between a normal position and a deflected position in response to movement of a bale to said predetermined position of engagement by the bale-engaging element, and means connected the sensing element to the control valve means to shift the control valve means to its first condition when the sensing element moves to its deflected position.]

[6. The invention defined in claim 5 wherein the control means includes shut-off means operatively connected to the control valve means and the engaging element for shifting the control valve means to its second condition when the engaging element reaches a predetermined position, to thereby establish the release position of the engaging element.]

[7. The invention defined in claim 6 wherein the control means includes adjusting means operatively associated with said shut-off means to selectively vary the predetermined position at which the control valve means is shifted to its second position and thereby vary the trajectory of the bale.]

8. The invention defined in claim [6] *4* wherein the control means includes pressure adjusting means adapted to selectively vary the pressure of the fluid supplied to the hydraulic motor means and thereby vary the force exerted by the hydraulic motor means on the arm means as it moves the bale-engaging element toward its release position.

9. In a baler having an associated power source, and a generally fore-and-aft bale case with a rearward outlet including a floor over which bales are successively discharged rearwardly, and a trailing remotely-spaced vehicle with a receptacle adapted to receive said bales, the improvement comprising: a supporting structure mounted on the baler adjacent the outlet of the bale case; arm means having one end pivotally connected to the supporting structure on a transverse pivot; a generally horizontal [pin] *pan* carried by the other end of the arm means and swingable therewith between a starting position, wherein it is disposed at substantially the same level as and rearwardly adjacent to the floor so that it is adapted to receive bales discharged out the bale case outlet and a release position upwardly and rearwardly from the starting position; hydraulic cylinder means having one end connected to the supporting structure and the other end connected to the arm means for swinging the [pin] *pan* from its starting position to its release position in response to extension of the cylinder means; a hydraulic pump mounted on the baler and driven by the power source; a control valve means shiftable between a first condition wherein it supplies fluid pressure from the pump to the cylinder means and a second condition wherein it interrupts the supply of pressurized fluid to the hydraulic cylinder means; a bale-sensing means operatively connected to the control valve means for shifting the control valve means to its first condition in response to movement of a bale to a predetermined position on the pan, and shut-off means operatively connecting the control valve means to the arm means to shift the control valve means to its second condition when the pan reaches its release position, whereby pressurized fluid is supplied to the hydraulic cylinder means to swing the arm means and the pan and bale thereon upwardly and rearwardly until the pan reaches its release position wherein the supply of fluid pressure to the cylinder means is interrupted to limit the movement of the pan, the momentum of the bale on the pan carrying the bale in a trajectory through the air to the trailing vehicle receptacle.

References Cited

The following references, cited by the Examiner, are of record in the patented file of this patent or the original patent.

UNITED STATES PATENTS

| | | | |
|---|---|---|---|
| 3,277,999 | 10/1966 | Gawreluk | 198—128 |
| 3,342,309 | 9/1967 | Hollyday | 214—42 X |
| 3,387,725 | 6/1968 | May et al. | 214—42 |

ROBERT G. SHERIDAN, Primary Examiner

U.S. Cl. X.R.

100—188 BT; 198—110, 128